United States Patent
Yamauchi et al.

(10) Patent No.: US 9,110,886 B2
(45) Date of Patent: Aug. 18, 2015

(54) DATA TRANSFER CONTROL APPARATUS, DATA TRANSFER CONTROL METHOD, AND COMPUTER PRODUCT

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/718,302

(22) Filed: Dec. 18, 2012

(65) Prior Publication Data

US 2013/0111078 A1 May 2, 2013

Related U.S. Application Data

(63) Continuation of application No. PCT/JP2010/060560, filed on Jun. 22, 2010.

(51) Int. Cl.
*G06F 13/28* (2006.01)

(52) U.S. Cl.
CPC ..................... *G06F 13/28* (2013.01)

(58) Field of Classification Search
None
See application file for complete search history.

(56) References Cited

U.S. PATENT DOCUMENTS

| | | | |
|---|---|---|---|
| 6,148,381 A | 11/2000 | Jotwani | |
| 7,360,035 B2 * | 4/2008 | Jenkins et al. | 711/150 |
| 7,487,503 B2 * | 2/2009 | Accapadi et al. | 718/103 |
| 2005/0120151 A1 | 6/2005 | Furukawa et al. | |
| 2006/0224785 A1 | 10/2006 | Nakashima et al. | |
| 2006/0230404 A1 * | 10/2006 | Sato et al. | 718/102 |
| 2007/0074219 A1 * | 3/2007 | Ginsberg | 718/102 |
| 2007/0162658 A1 | 7/2007 | Furukawa et al. | |
| 2007/0226739 A1 * | 9/2007 | Dodge et al. | 718/102 |
| 2008/0109576 A1 | 5/2008 | Furukawa et al. | |
| 2009/0259789 A1 * | 10/2009 | Kato et al. | 710/308 |

FOREIGN PATENT DOCUMENTS

| | | |
|---|---|---|
| JP | 1-305461 | 12/1989 |
| JP | 11-237960 | 8/1999 |
| JP | 2002-217920 | 8/2002 |
| JP | 2005-165439 | 6/2005 |
| JP | 2006-285341 | 10/2006 |
| JP | 2007-58276 | 3/2007 |
| JP | 2008-90455 | 4/2008 |

OTHER PUBLICATIONS

International Preliminary Report on Patentability mailed Jan. 24, 2013, issued in corresponding PCT Patent Application No. PCT/JP2010/060560.

(Continued)

*Primary Examiner* — Elias Mamo
(74) *Attorney, Agent, or Firm* — Staas & Halsey LLP

(57) ABSTRACT

A data transfer control apparatus includes a transferring unit that transfers data from a transfer source memory to a transfer destination memory, according to an instruction from a first processor; and a first processor configured to detect a process execute by the first processor, determine whether transfer of the data is urgent, based on the type of the detected process, and control the transferring unit or the first processor to transfer the data, based on a determination result.

8 Claims, 13 Drawing Sheets

(56) References Cited

OTHER PUBLICATIONS

"Fully Using DMC", Retrieved on May 6, 2010, http://jp.fujitsu.com/microelectronics/products/micom/support/knowhow/fr-hard05.html , © 1994.
International Search Report of PCT/JP2010/060560 mailed Sep. 21, 2010.
Chinese Office Action for corresponding Chinese Patent Application No. 201080067574.0, issued Dec. 3, 2014, 21 pages.
U.S. Office Action mailed Apr. 27, 2015 in related U.S. Appl. No. 14/630,235.
Chinese Office Action issued Jun. 3, 2015 in corresponding Chinese Patent Application No. 201080067574.0.

* cited by examiner

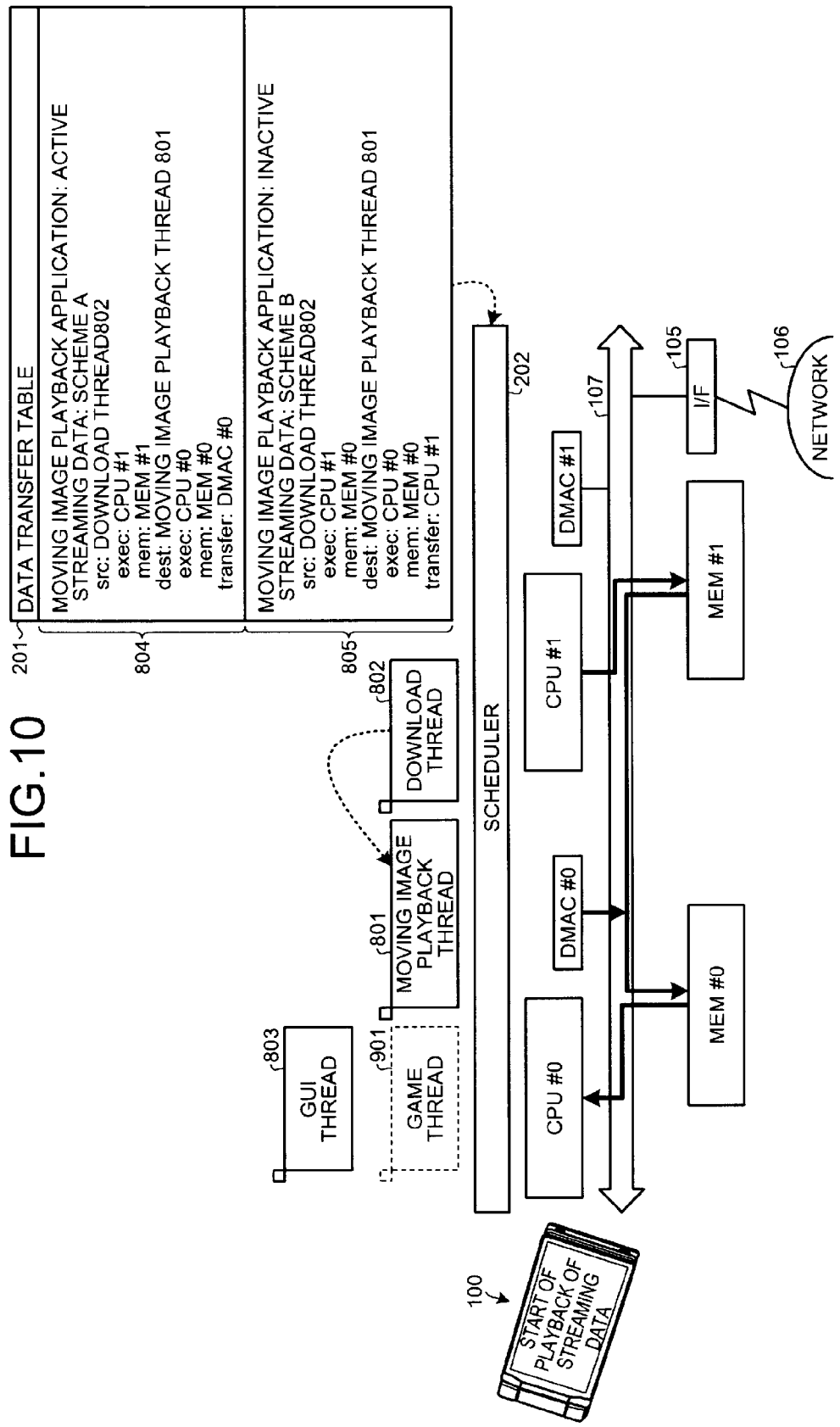

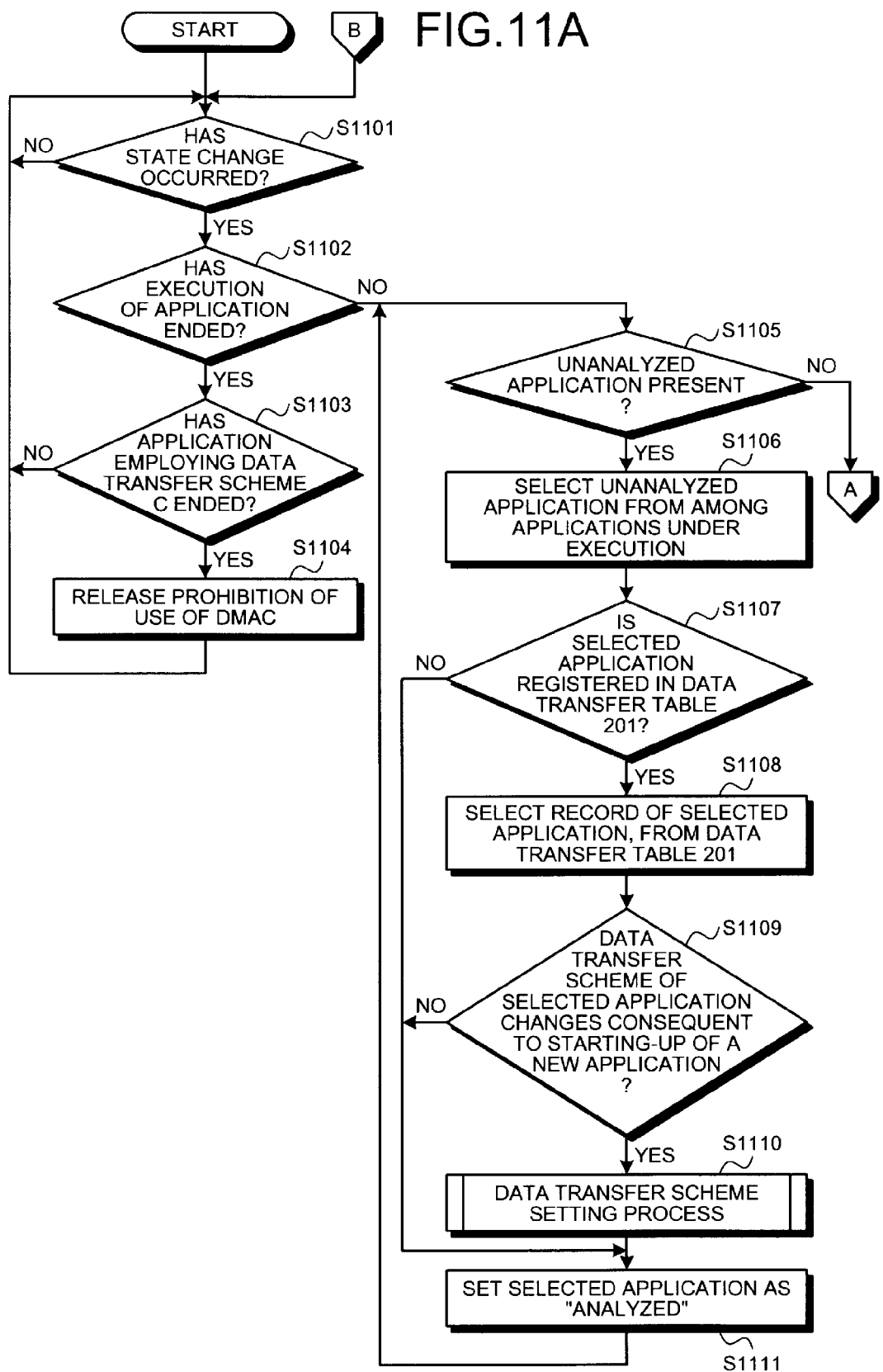

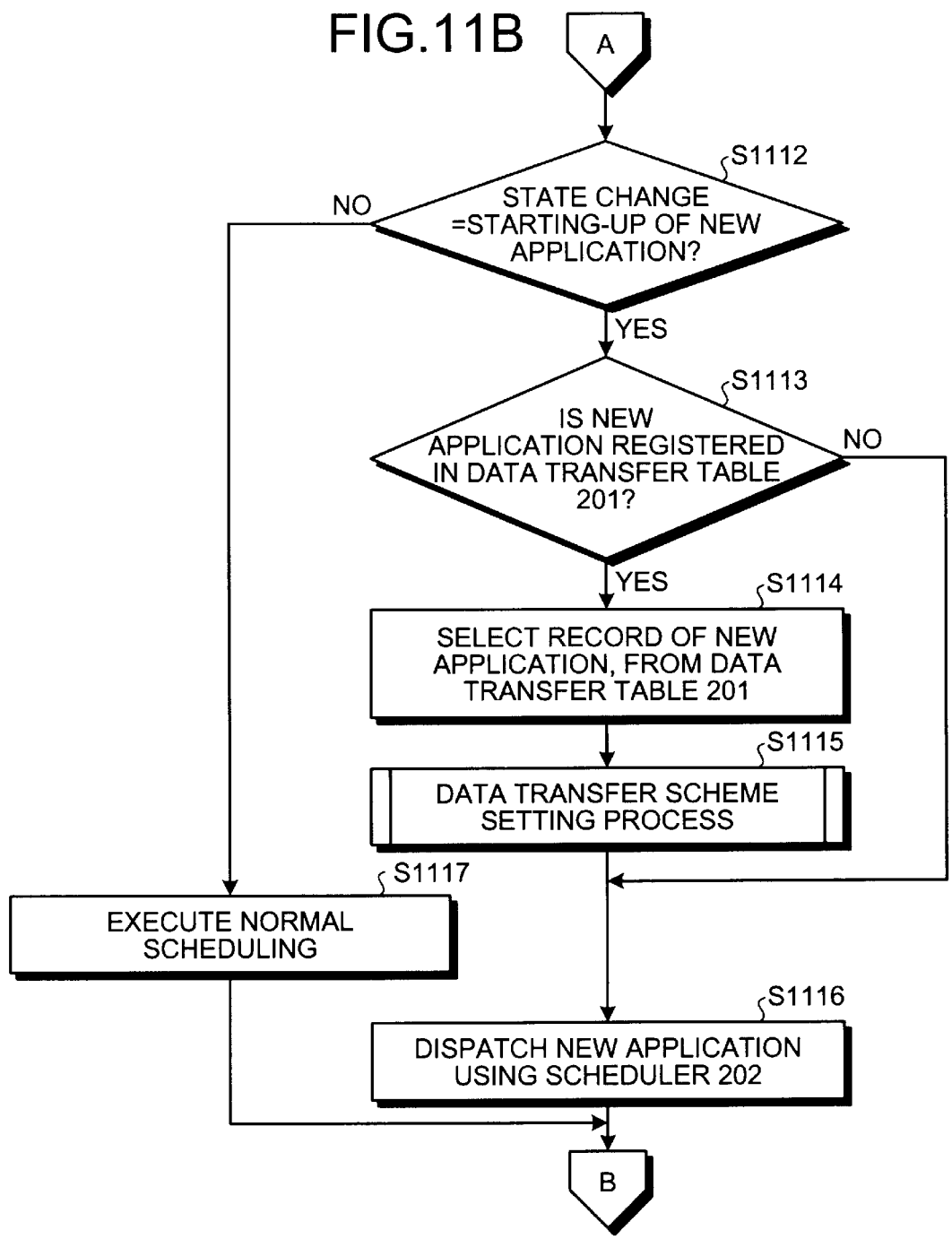

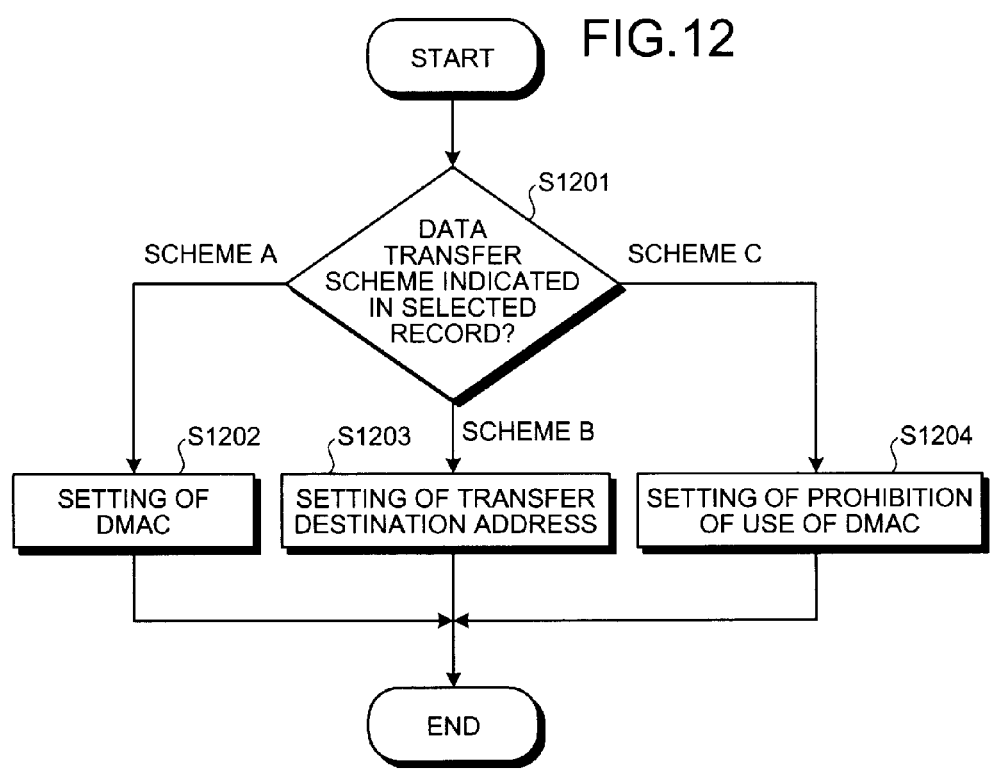

DATA TRANSFER CONTROL APPARATUS, DATA TRANSFER CONTROL METHOD, AND COMPUTER PRODUCT

CROSS REFERENCE TO RELATED APPLICATIONS

This application is a continuation application of International Application PCT/JP2010/060560, filed on Jun. 22, 2010 and designating the U.S., the entire contents of which are incorporated herein by reference.

FIELD

The embodiments discussed herein are related to a data transfer control apparatus, a data transfer control method, and a computer product that control a data transfer.

BACKGROUND

Conventionally, direct memory access (DMA) transfer technologies have been disclosed for high speed data transfer between memories. A direct memory access controller (DMAC) is used as a dedicated controller to execute the DMA transfer. The DMAC has a function of executing data transfer from memory to memory, or from memory to a peripheral device without passing through a CPU.

For example, among various types of multi-core processor systems, in a distributed-memory multi-core processor system having memories respectively corresponding to a core, calculation results obtained by each core are stored to the memory corresponding to the core. After the storage, the multi-core processor system executes a DMA transfer to the memory of a master core, using the DMAC. Alternatively, when a process assigned to a different core uses the calculation results, the multi-core processor system executes a DMA transfer to the memory corresponding to that core.

DMAC control has been disclosed where a CPU transfers small amounts of data or discrete data and the DMAC executes transfers of large amounts of continuous data, whereby, higher data transfer speeds are realized (see, e.g., Japanese Laid-Open Patent Publication No. 2007-58276).

Another technique of DMAC control has been disclosed where distributed shared memories are used to efficiently execute a pipeline process for a data transfer process executed by the DMAC and an image process executed by a CPU, using (see, e.g., Japanese Laid-Open Patent Publication No. 2008-90455).

However, with the techniques according to Japanese Laid-Open Patent Publication Nos. 2007-58276 and 2008-90455, the bus is occupied due to a burst transfer by the DMAC and the CPU stands by until completion of the transfer by the DMAC. Therefore, a problem arises that the throughput of the CPU is degraded. When an interruption process occurs, the CPU tries to read an interruption handler present on a memory. However, the CPU reads the interruption handler after the completion of the DMA transfer executed by the DMAC. Therefore, a problem arises in that responsiveness with respect to real-time processes is degraded.

SUMMARY

According to an aspect of an embodiment, a data transfer control apparatus includes a transferring unit that transfers data from a transfer source memory to a transfer destination memory, according to an instruction from a first processor; and a first processor configured to detect a process execute by the first processor, determine whether transfer of the data is urgent, based on the type of the detected process, and control the transferring unit or the first processor to transfer the data, based on a determination result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is an explanatory diagram of a state of the streaming data transfer while a game application is interrupted;

FIGS. 11A and 11B are flowcharts of a data transfer scheme transition process; and FIG. 12 is a flowchart of a data transfer scheme setting process.

DESCRIPTION OF EMBODIMENTS

Preferred embodiments of a data transfer control apparatus, a data transfer control method, and a computer product according to the present invention will be described in detail with reference to the accompanying drawings.

Figure 1:
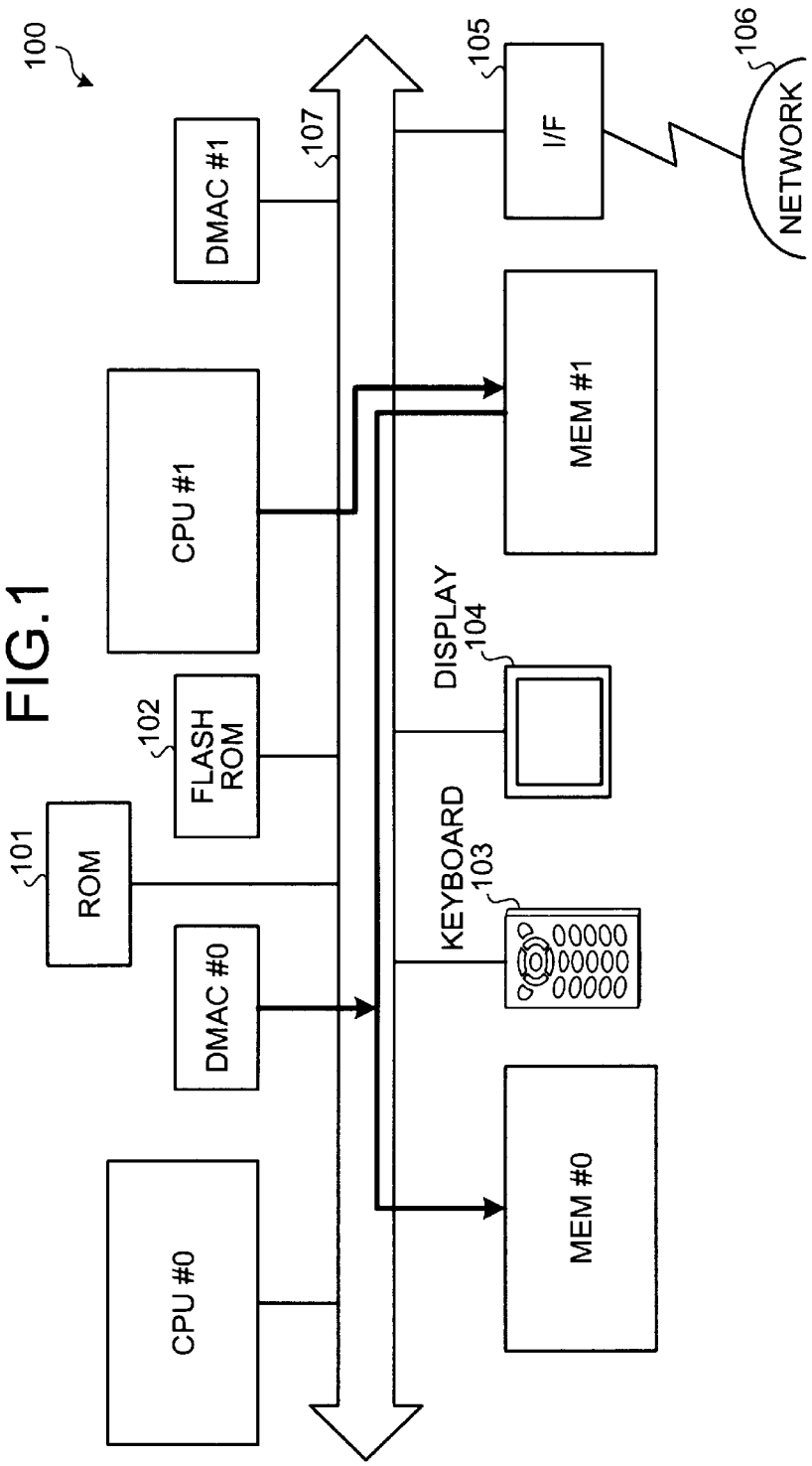
FIG. 1 is a block diagram of hardware of a data transfer control apparatus according to an embodiment.

FIG. 1 is a block diagram of hardware of a data transfer control apparatus according to the embodiment. In FIG. 1, the data transfer control apparatus 100 includes central processing units (CPUs) #0 and #1, memories (MEMs) #0 and #1, DMACs #0 and #1, a read-only memory (ROM) 101, and a flash ROM 102. The data transfer control apparatus 100 includes a keyboard 103, a display 104, and an interface (I/F) 105 as an input/output devices for the user and other apparatuses. These components are respectively connected by a bus 107.

The CPUs #0 and #1 supervise the overall control of the data transfer control apparatus 100. The ROM 101 stores programs such as a boot program. The MEMs #0 and #1 are storage apparatuses such as random access memories (RAMs) that respectively are used as work areas of the CPUs #0 and #1. The DMACs #0 and #1 transfer data between the MEMs #0 and #1. The CPU #0 mainly controls the DMAC #0. The CPU #1 controls the DMAC #1. The data transfer control apparatus 100 according to the embodiment is a computer system that includes a processor having multiple cores. Although the data transfer control apparatus 100 according to the embodiment has the two CPUs, the data transfer control apparatus 100 may have three or more CPUs. A case where the data transfer control apparatus 100 has three or more CPUs will be described in detail with reference to FIG. 4.

The keyboard 103 includes keys to input numbers, various kinds of instructions, etc., and is used to input data. The keyboard 103 may be an input pad or a numerical keyboard of a touch-panel type. The display 104 displays data such as documents, images, and functional information in addition to a cursor, an icon, and a tool box. For example, a TFT liquid crystal display can be employed as the display 104.

The I/F 105 is connected to a network 106 such as a local area network (LAN), a wide area network (WAN), or the Internet through a communication line, and is also connected to other devices through the network 106. The I/F 105 manages an internal interface with the network 106 and controls the input and output of data with respect to external devices. For example, a modem or a LAN adaptor can be employed as the I/F 105.

A conventional data transfer control apparatus includes hardware identical to that of the data transfer control apparatus 100 according to the embodiment. However, in a conventional data transfer control apparatus, during data transfer from the MEM #1 to the MEM #0 by the DMAC #0, the CPU #1 can not access the MEM #1 and must wait to access the data.

Figure 2:
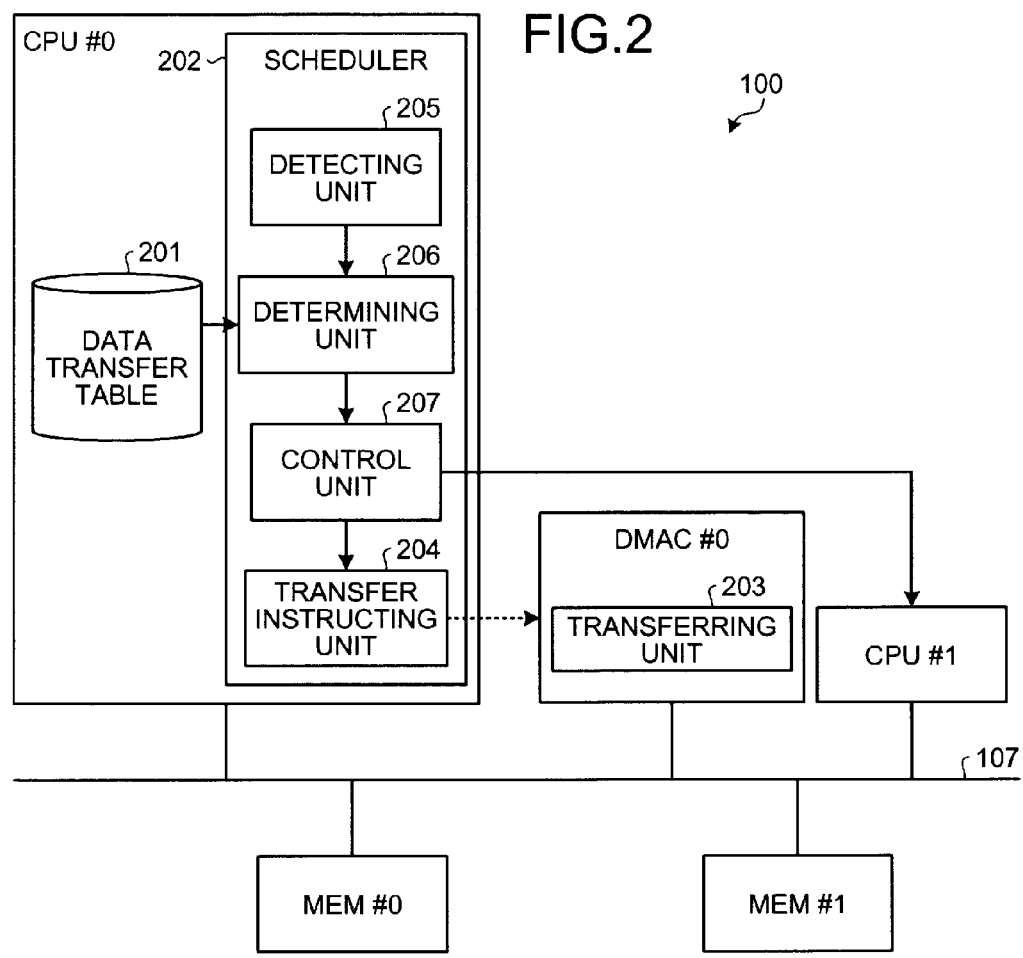
FIG. 2 is a block diagram of functions of the data transfer control apparatus 100.

Functions of the data transfer control apparatus 100 will be described. FIG. 2 is a block diagram of the functions of the data transfer control apparatus 100. The data transfer control apparatus 100 includes a transferring unit 203, a transfer instructing unit 204, a detecting unit 205, a determining unit 206, and a control unit 207. These functional units (the transfer instructing unit 204 to the control unit 207) forming a control unit are implemented by executing on the CPU #0, programs stored in a storage apparatus. The storage apparatus is, for example, the ROM 101, the flash ROM 102, or the MEM #0 or #1 depicted in FIG. 1. The transferring unit 203 is implemented by the DMAC #0.

The data transfer control apparatus 100 can access a data transfer table 201 storing data transfer schemes that correspond to changes in the states of processes executed in the data transfer control apparatus 100. The data transfer table 201 will be described in detail with reference to FIGS. 3 and 4. The transfer instructing unit 204, the detecting unit 205, the determining unit 206, and the control unit 207 are functions included in a scheduler 202.

The scheduler 202 is software included in an OS and has a function of determining a process to be assigned to a CPU. For example, the scheduler 202 determines a process to be assigned to a CPU next based on the priority, etc., set for the process. At a predetermined time, the scheduler 202 assigns the process determined by a dispatcher to the CPU. Configuration may be such that the scheduler includes the dispatcher as a function of the scheduler. In the embodiment, the scheduler 202 includes a function of the dispatcher.

Although FIG. 2 depicts the CPU #0 to include the transfer instructing unit 204 to the control unit 207, the schedulers of other CPUs also include the transfer instructing unit 204 to the control unit 207. Similarly, DMACs other than the DMAC #0 also include the transferring unit 203.

The transferring unit 203 has a function of transferring the data to be transferred, from a transfer source memory to a transfer destination memory according to an instruction of the processor. For example, the DMAC #0 transfers streaming data as the data to be transferred, from the MEM #1 that is the transfer source memory to the MEM #0 that is the transfer destination memory according to an instruction by the CPU #0.

The transfer instructing unit 204 has a function of instructing the transferring unit 203 to transfer the data to be transferred. For example, the transfer instructing unit 204 notifies the DMAC #0 of the address of the MEM #1 as the transfer source memory and the address of the MEM #0 as the transfer destination memory, and instructs the DMAC #0 to transfer the data. The content of the instruction, including the addresses of the transfer source memory and the transfer destination memory, and the data size of the data to be transferred, to be may be stored to a storage area such as in a register or a local memory of the CPU that executes the transfer instructing unit 204.

The detecting unit 205 has a function of detecting a process executed by a processor. A "process" is an execution unit of a program. Each application in the embodiment retains therein one process. Each process retains therein one or more threads. The detecting unit 205 may detect a change in the state of a process. The detecting unit 205 may detect that the state of the process changes, for example, from "active" to "inactive" or from "inactive" to "active". When the state of the process is "active", the process requires the user to input data into or perform an operation. When the state of the process is "inactive", the process does not require the user to input data into or perform an operation.

A "change in the state" refers to a case where an event is detected that the process is started up or comes to an end. Changes in the state may also include cases where the state of the process changes to "active" or "inactive" by switching consequent to dispatching. A change in the state may also be a change in the utilization state of data that is to be transferred to the process. For example, in a case where the data to be transferred is a streaming moving image, if a change occurs such as a change in the playback of the moving image from "play" to "pause" or to "rewind and play", the detecting unit 205 may detect such changes as a change in the state.

For example, the detecting unit 205 detects an application executed by the CPU #0. The detecting unit 205 detects each occurrence of the starting up, ending, and switching of the application. Detection results are stored to a storage area such as a register or local memory of the CPU that executes the detecting unit 205.

The determining unit 206 has a function of determining whether the transfer by the transferring unit 203 is urgent, based on the process type detected by the detecting unit 205. If the detecting unit 205 detects a change in the state of the process, the determining unit 206 may determine the urgency of the transfer of the data, based on the process type and the change in the state. The determining unit 206 may further determine whether storing of the data to be transferred, by the other processor into the transfer source memory is urgent. The other processor: is a processor that stores the data to be transferred, into the transfer source memory; and is a processor different from the processor that detects the process using the detecting unit 205; but may be the same processor as the processor that detects the process.

"Urgency" refers to a time restriction and an "urgent data transfer" refers to a data transfer of a real-time process and having a time restriction. The determining unit 206 may determine that, for a real-time process, a data transfer requires a large amount of processing, has a high priority and thus, is an urgent data transfer; and may determine that a data transfer having a time restriction further has sufficient time until the processing comes to an end and thus, is not urgent. If a setting is made by the user for a data transfer that although is not a real-time process, requires the data to be transferred as soon as possible, the determining unit 206 may determine that the transfer to be urgent.

The playback of a streaming moving image through the network 106 is an example of a transfer of data to that is urgent. If the transfer of data is urgent, storage of the data into the transfer source memory has to be executed before the playback and at a high speed. In the example of a streaming moving image, the data to be transferred has to be transferred at a bit rate that is greater than or equal to that of the streaming moving image and therefore, the data transfer control apparatus 100 has to store the data to be transferred by executing a communication process at a high speed. The data transfer control apparatus 100 has to further transfer the streaming moving image at a high speed to the work area of the CPU that is to playback the streaming moving image.

A communication process through the network 106 is an example where the transfer of the data is not urgent while the storage of the data is urgent. Time-out may occur to the communication process if the process is not completed within a specific time period, and the counterpart terminal of the communication process may cause the communication to come to an end. Therefore, the data transfer control apparatus 100 has to store the data to be transferred at a high speed and perform the communication process also at a high speed.

For example, the determining unit 206 acquires from among the records in the data transfer table 201, a record whose application type and application state of "active" or "inactive" coincide. According to the data transfer scheme described in the record acquired, the determining unit 206 determines whether the transfer of the data is urgent or whether storage of the data into the transfer source memory is urgent.

For example, when "Scheme A" is described in the record acquired, the determining unit 206 determines that the transfer of the data to be transferred is urgent and when "Scheme B" is described in the record acquired, the determining unit 206 determines that the transfer of the data is not urgent. When "Scheme B" is described in the record acquired, the determining unit 206 determines that the storage of the data to be transferred is not urgent and the transfer of the data to be transferred is also not urgent. When "Scheme C" is described in the record acquired, the determining unit 206 determines that the storage of the data is not urgent and the transfer of the data is urgent. Determination results restored to a storage area such as a register or local memory of the CPU that executes the determining unit 206.

The control unit 207 has a function of controlling the transferring unit 203 or the processor to transfer the data to be transferred. The control unit 207 performs this control based on determination results of the determining unit 206. If the determining unit 206 determines that the transfer of the data is urgent, the control unit 207 may control the transferring unit 203 to transfer the data to be transferred.

If the determining unit 206 determines that the storage and the transfer of the data are not urgent, the control unit 207 may control another processor storing data to be transferred, to transfer the data to the transfer source memory. If the determining unit 206 determines that the storage of the data to be transferred is urgent and the transfer of the data is not urgent, the control unit 207 may control the processor detecting the process to transfer the data.

For example, if the data transfer scheme is the "Scheme A", the control unit 207 controls the DMAC #0 that corresponds to the CPU #0 to transfer the data to be transferred. If the data transfer scheme is the "Scheme B", the control unit 207 controls the CPU #1 that stores the data to be transferred in the MEM #1 (transfer source memory), to transfer the data. In this case, the CPU #1 does not store the data into the MEM #1 and directly writes the data into the MEM #0 (transfer destination memory).

For example, when the data transfer scheme is the "Scheme C", the control unit 207 controls the CPU #0 to transfer the data to be transferred, from the MEM #1 (transfer source memory). In this case, after reading the data from the MEM #1, the CPU #0 does not store the data into the MEM #0, but rather stores the data into the register, etc. of the CPU #0 and transfers the data to a program, etc. that directly accesses the data.

Figure 3:
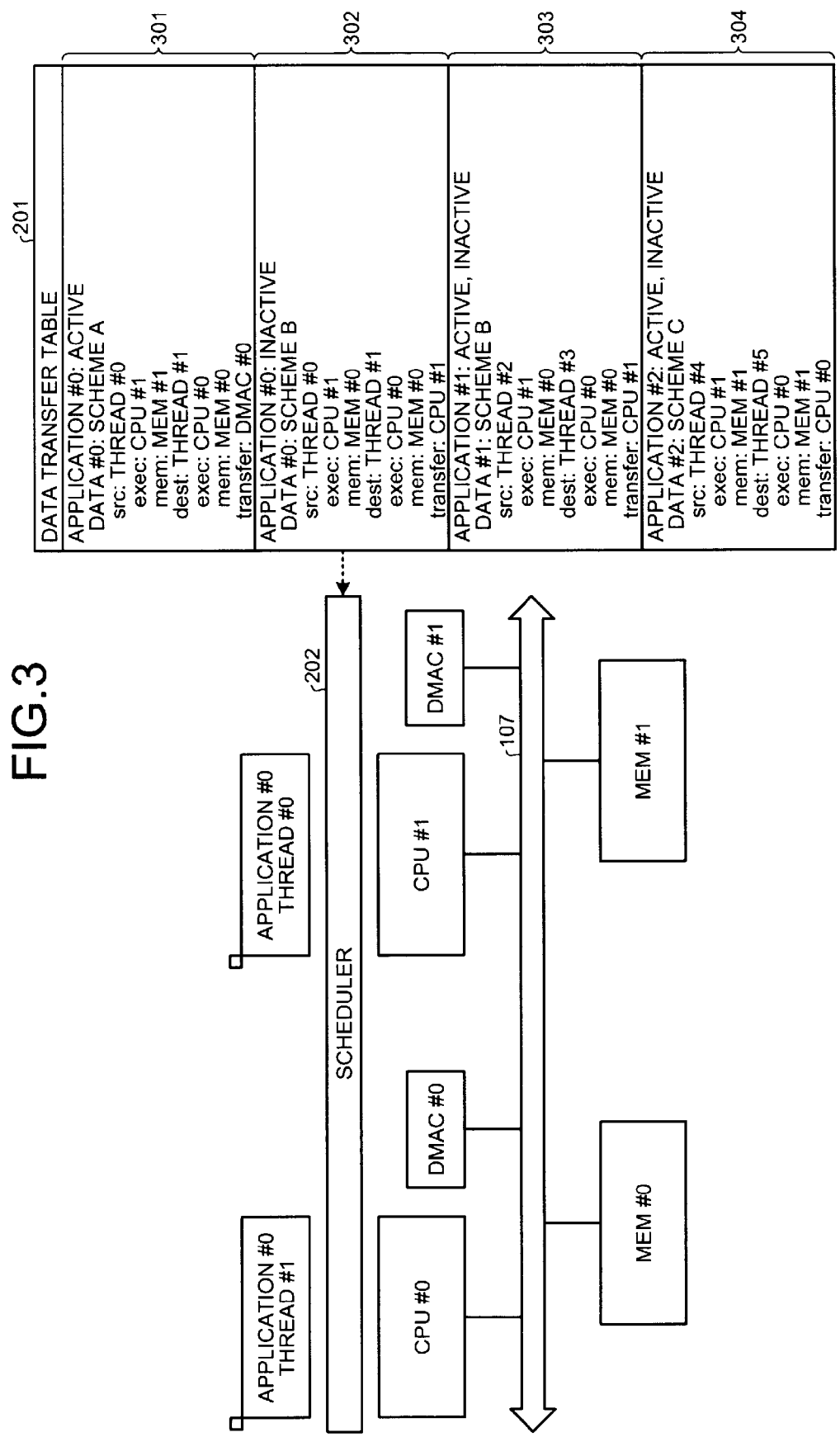
FIG. 3 is an explanatory diagram of an example of the data transfer control apparatus 100 and of the contents of the data transfer table 201.

FIG. 3 is an explanatory diagram of an example of the data transfer control apparatus 100 and of the contents of the data transfer table 201. The data transfer table 201 is a table to determine the data transfer scheme, based on the application to which the scheduler 202 transfers the data and the determination result concerning whether the state of the application is "active" or "inactive". The data transfer table 201 describes for each data item to be transferred, information such as the CPU that executes the thread set in a "src" attribute and a write destination of the data to be transferred; and the CPU that executes the thread set in a "dest" attribute and a read destination of the data to be transferred. In the data transfer table 201, the entity that transfers the data written in the "src" attribute, to the read destination in the "dest" attribute is set in a "transfer" attribute.

For example, in a record 301, the scheduler 202 determines whether an application #0 is started up and becomes "active", from "active" of an application-#0 attribute. If the scheduler 202 determines that the application #0 becomes "active", the scheduler 202 sets the data transfer scheme to be the scheme A, from "Scheme A" of a data-#0 attribute.

From the third to the fifth lines of the record 301, the scheduler 202 executes a thread #0 set in the "src" attribute using the CPU #1 set in an "exec" attribute, and sets the write destination of data #0 to be the data to be transferred, to be the MEM #1 set in a "mem" attribute. From the sixth to the eighth lines of the record 301, the scheduler 202 executes a thread #1 set in a "dest" attribute using the CPU #0 and sets the read destination of the data #0 to be the MEM #0.

The scheduler 202 controls the DMAC #0 set in the "transfer" attribute to transfer the data #0 written in the MEM #1 to the MEM #0. The specific example of the data transfer scheme A will be described in detail with reference to FIG. 5. The contents set as described above given to the CPU and the CPU makes settings for a memory management unit (MMU), etc., and also executes the corresponding application.

For each of records 302 to 304, the scheduler 202 also executes the setting method similarly to that for the record 301. For example, the scheduler 202 sets the data transfer scheme to be the scheme B based on the record 302 when the application #0 becomes "inactive".

The scheduler 202 causes the CPU #1 to execute the thread #0 set in the "src" attribute; determines that the write destination of the data #0 (data to be transferred) is the MEM #0, which is same as the read destination; and controls the CPU #1 to directly write thereinto. The scheduler 202 causes the CPU #0 to execute the thread #0 set in the "dest" attribute and controls the CPU #0 to read the data #0 written by the CPU #1. The "transfer" attribute has the CPU #1 set therein that directly writes into the read destination of the "dest" attribute. An example of the data transfer scheme B will be described in detail with reference to FIG. 6. The scheduler 202 sets the data transfer scheme to be the scheme B based on the record 303 when the application #1 becomes "active" or "inactive".

The scheduler 202 sets the data transfer scheme to be the scheme C based on the record 304 when an application #2 becomes "active" or "inactive". The scheduler 202 executes a thread #4 set in the "src" attribute using the CPU #1 and sets the write destination of the data #2 to be the data to be transferred, to be the MEM #1. The scheduler 202 executes a thread #5 set in the "dest" attribute using the CPU #0 and controls the CPU #0 to directly read the data #2 written by the CPU #1 into the MEM #1. The "transfer" attribute has the CPU #0 set therein that directly reads into the write destination of the "src" attribute. An example of the data transfer scheme C will be described in detail with reference to FIG. 7.

After the execution of the application comes to an end, the scheduler 202 resets the settings of the CPUs to the initial values. Thereafter, when the application that changes the data transfer scheme is again started up, the scheduler 202 reads the data transfer table 201 to change the data transfer scheme. The application to which the thread set in the "src" attribute belongs and the application to which the thread set in the "dest" attribute belongs may be the same application or respectively different applications.

Figure 4:
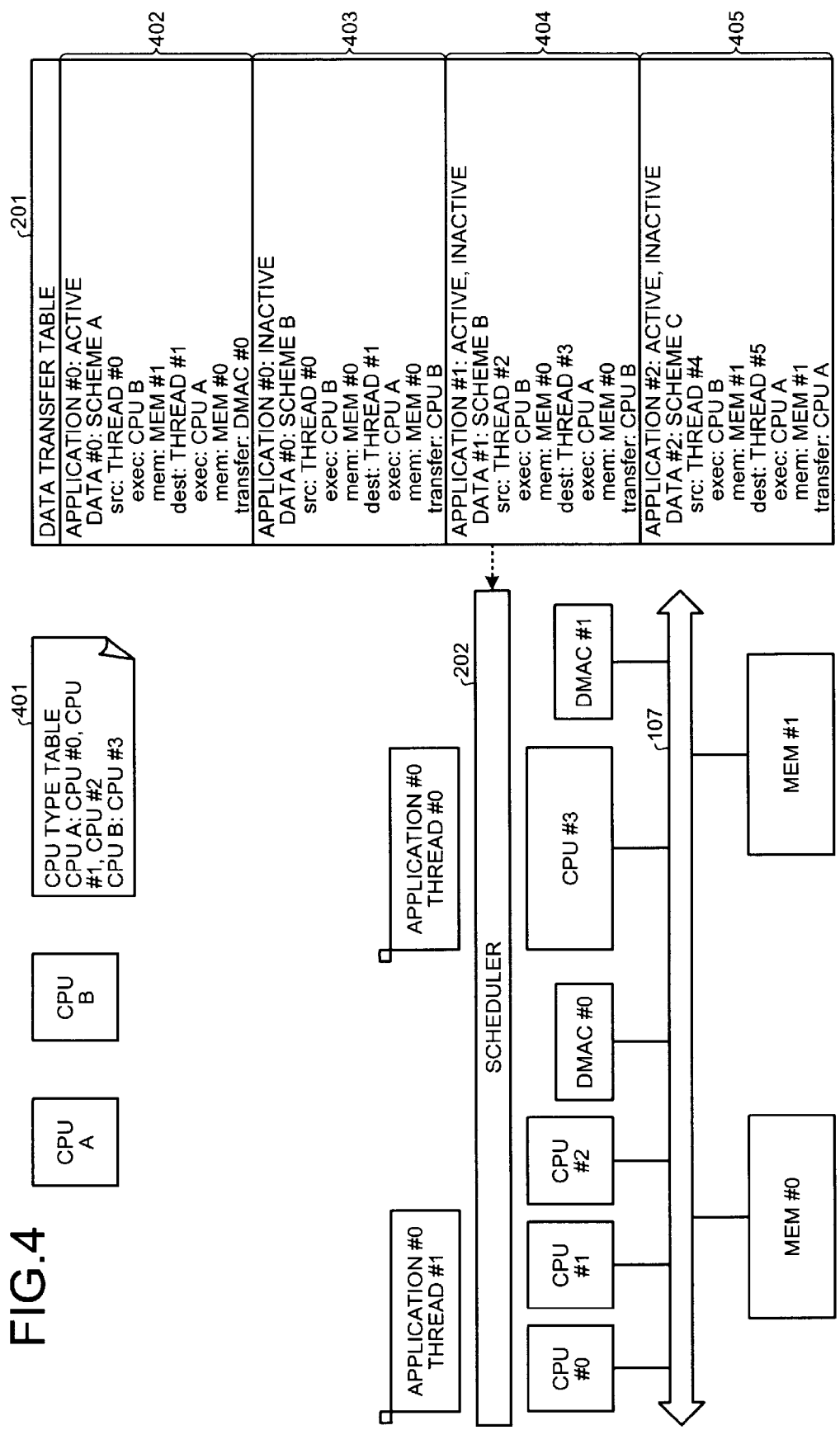
FIG. 4 is an explanatory diagram of an example of the data transfer control apparatus 100 and of the contents of the data transfer table 201 for a case where three or more CPUs are present.

FIG. 4 is an explanatory diagram of an example of the data transfer control apparatus 100 and of the contents of the data transfer table 201 for a case where three or more CPUs are present. A CPU type table 401 is a table for classifying the types of the CPUs. In the example of FIG. 4, the CPUs are classified into "CPU A" as general-purpose control processors and "CPU B" as signal-processing DSPs. The CPU A includes the CPUs #0, #1, and #2. The CPU B includes the CPU #3. For example, when "CPU A" is described in the data transfer table 201, the scheduler assigns the thread #0 to any one of the CPUs of "CPU A".

For example, the scheduler 202 sets the data transfer scheme to be the scheme A based on the record 402 when the application #0 becomes "active". The scheduler 202 executes the thread #0 set in the "src" attribute using any one of the CPUs belonging to CPU B set in the "exec" attribute, and sets the write destination of the data to be transferred to be the MEM #1 set in the "mem" attribute.

The scheduler 202 executes the thread #1 set in the "dest" attribute using any one of the CPUs belonging to CPU A, and sets the read destination of the data #0 to be the MEM #0. In the example of FIG. 4, the CPU #3 executes the thread #0 and the CPU #0 executes the thread #1. The scheduler 202 controls the DMAC #0 set in the "transfer" attribute to transfer the data #0 written in the MEM #1, to the MEM #0.

For each of records 403 to 405, the scheduler 202 also executes the setting method similarly to that for the record 301. For example, the scheduler 202 sets the data transfer scheme to be the scheme B based on the record 403 when the application #0 becomes "inactive". The scheduler 202 executes the thread #0 set in the "src" attribute using any one of the CPUs of CPU B, determines that the write destination of the data #0 (data to be transferred) is the MEM #0, and controls the CPU that executes the thread #0 to write thereinto. The scheduler 202 executes the thread #1 set in the "dest" attribute using any one of the CPUs of CPU A and controls the CPU that executes the thread #1 to read the data #0 written by any one of the CPUs of CPU B. The "transfer" attribute has CPU B set therein that is directly written into the read destination of the "dest" attribute.

Figure 5:
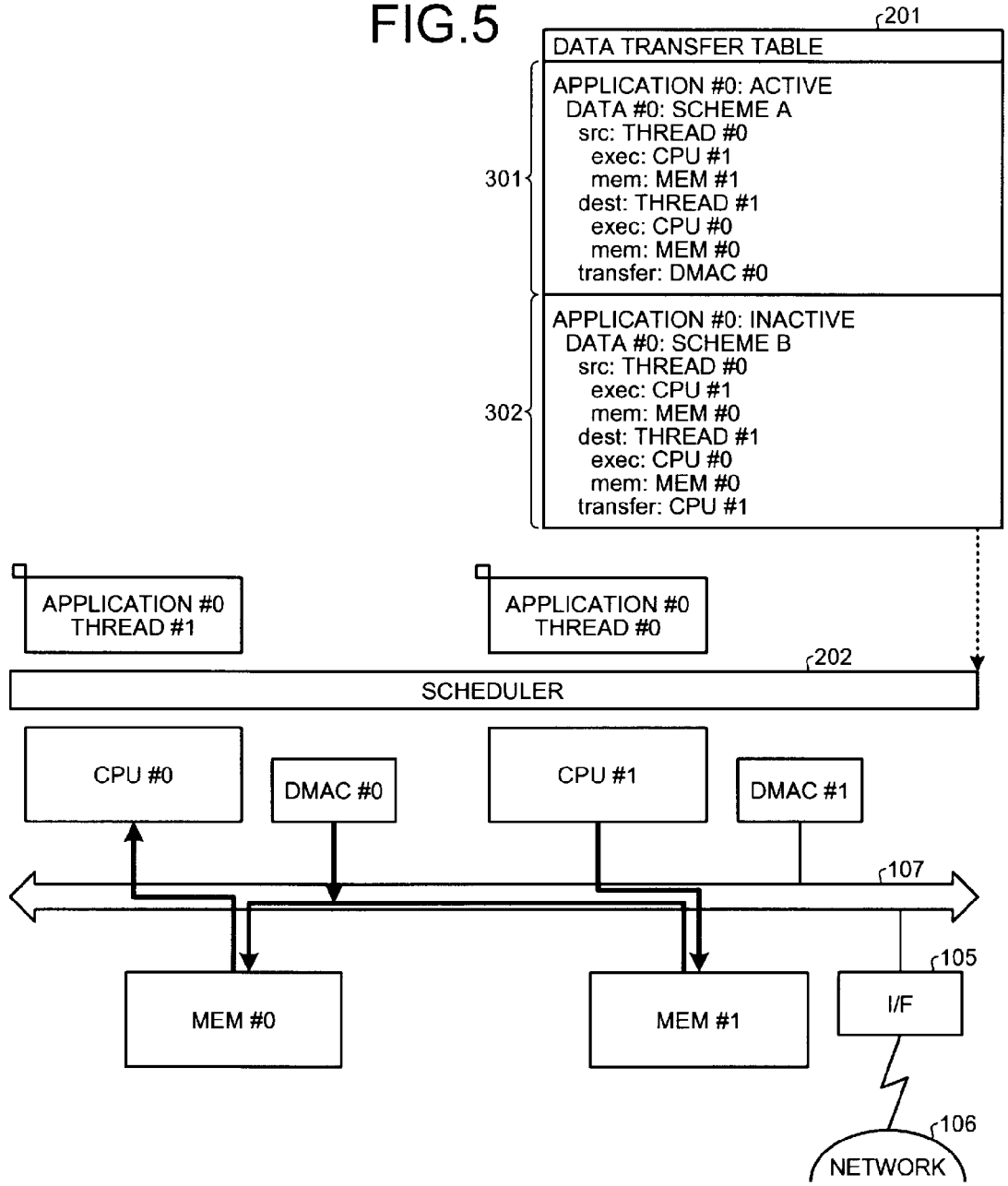
FIG. 5 is an explanatory diagram of a data transfer scheme A.

FIG. 5 is an explanatory diagram of the data transfer scheme A. The scheme A is the data transfer scheme for the case where the storage and the transfer of the data to be transferred are urgent. For example, description will be made with reference to FIG. 5 for a case where a thread to execute communication and a thread using the data to be transferred and acquired in the communication are both urgent and the respective processes are executed at a high speed. For example, in the example depicted in FIG. 5, the thread #0 to execute communication by the application #0 and the thread #1 to display on the display 104 using the data acquired in the communication are both urgent.

Based on the record 301, the scheduler 202 controls the CPU #1 to write the data #0 (data to be transferred) into the MEM #1 that corresponds to the CPU #1 currently executing the tread #0, to execute the communication at a high speed for the thread #0. To read at a high speed the result for the thread #1, the scheduler 202 controls the DMAC #0 to transfer the data #0 from the MEM #1 to the MEM #0. The scheme A is applicable to, for example, streaming playback of a moving image. The data transfer according to the scheme A can transfer at a high speed, the data to be transferred using burst transfer executed by the DMAC. During the transfer of the data, the bus 107 is occupied by the transfer.

Figure 6:
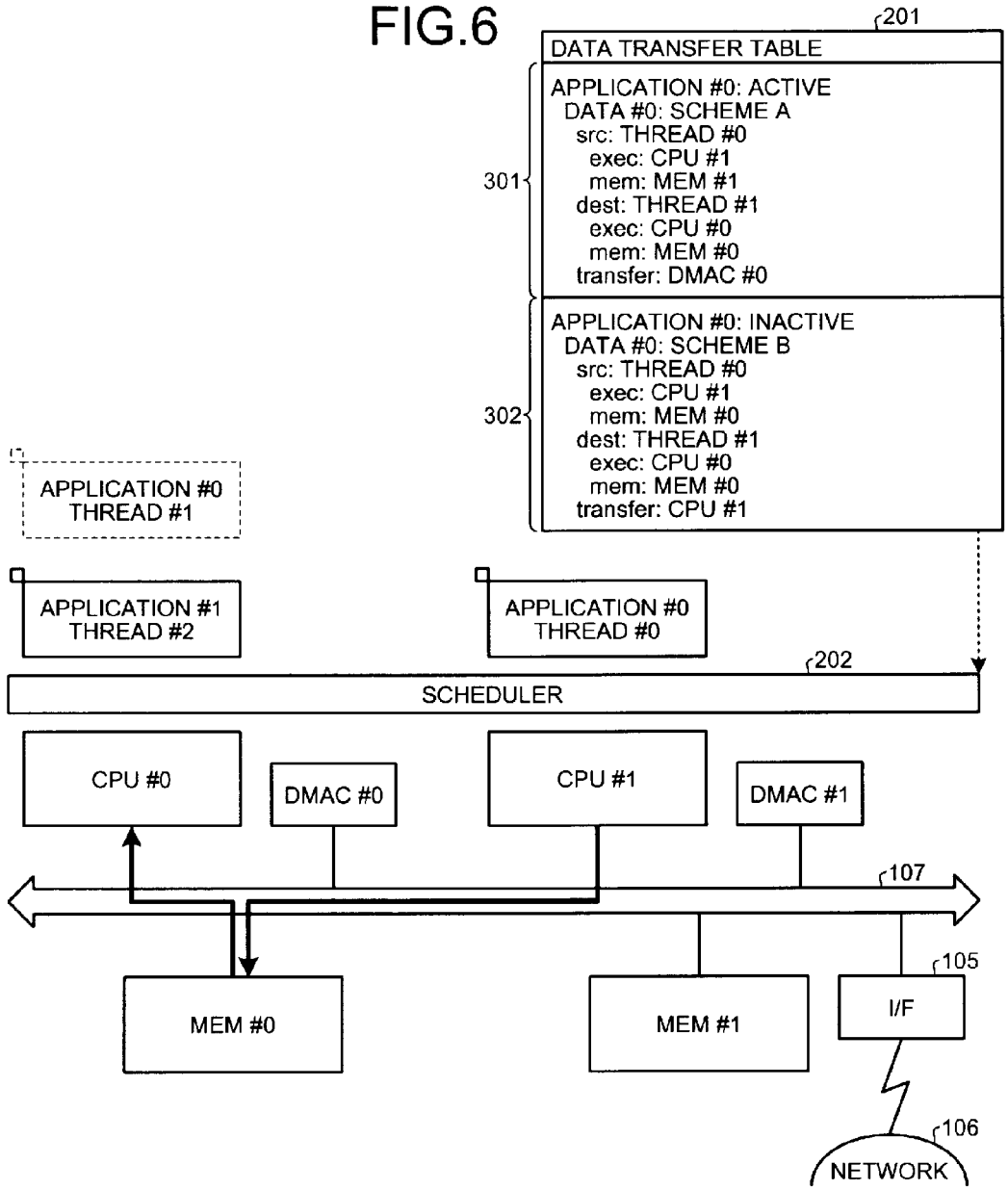
FIG. 6 is an explanatory diagram of a data transfer scheme B.

FIG. 6 is an explanatory diagram of the data transfer scheme B. The scheme B is a data transfer scheme employed in the case where neither the storage of nor the transfer of the data to be transferred are urgent. For example, description will be made with reference to FIG. 6 assuming that neither the thread to execute the communication nor the thread using the data to be transferred and acquired in the communication is urgent. The state is changed from the state depicted in FIG. 5 to the state of the example depicted in FIG. 6, where the application #1 is started up and becomes "active"; the application #0 becomes "inactive"; and as a result, the thread #0 that executes the communication and the thread #1 that displays the moving image are no longer urgent consequent to, for example, the application #0 becoming "inactive" and a screen area for displaying the moving image by the thread #1 being hidden by the application #1.

In this case, based on the record 302, the scheduler 202 does not have to execute the communication at a high speed for the thread #0 and therefore, controls the CPU #1 to write the data #0 into the MEM #0 that is not the memory dedicated to the CPU #0. The scheduler 202 also controls the CPU #0 to read the data #0 from the MEM #0 into the thread #1. The scheme B is applicable to, for example, a process of downloading a file that is executed in the background.

Figure 7:
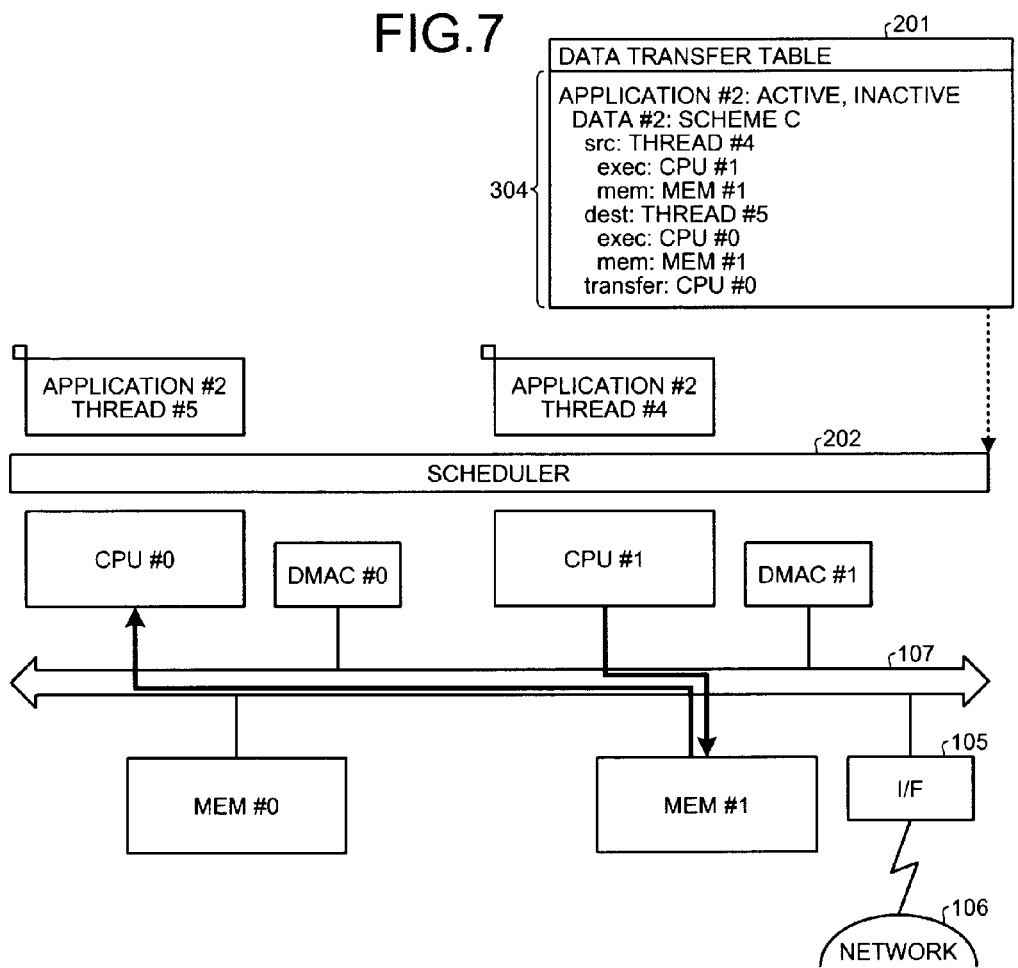
FIG. 7 is an explanatory diagram of a data transfer scheme C.

FIG. 7 is an explanatory diagram of the data transfer scheme C. The scheme C is a data transfer scheme employed in a case where the storage of the data to be transferred is urgent and the transfer of the data to be transferred is not urgent. For example, description will be made with reference to FIG. 7 assuming that the thread that executes the communication is urgent while the thread that uses the data to be transferred and acquired in the communication is not urgent. For example, in the example depicted in FIG. 7, the thread #4 of the application #2 is to execute the communication process at a high speed and therefore, is urgent. However, the thread #5 whose operation is associated with the thread #4 is not urgent.

Based on the record 304, the scheduler 202 controls the CPU #1 to write the data #2 (data to be transferred) into the MEM #1 dedicated to the CPU #1 currently executing the thread #4, to execute the communication at a high speed for the thread #4. The result of the thread #5 does not have to be read at a high speed and therefore, the scheduler 202 prohibits use of the DMAC #0 and controls the CPU #0 to read the data #2. The scheme C is applicable to, for example, reception of electronic mail.

For example, it is assumed that the application #2 is electronic mail software; the thread #4 is a download thread; and the thread #5 is an electronic mail acquisition thread. The CPU #1 receives mail data from the network 106 through the I/F 105 using the download thread and writes the mail data into the MEM #1. The CPU #0 uses the electronic mail acquisition thread to read from the MEM #1.

According to a data transfer scheme acquired by combining the schemes B and C, the data is transferred by the CPU and consequently, the transfer speed of the data is low compared to that of the transfer by the DMAC, but the bus 107 is not occupied. Therefore, drops in throughput caused by the CPU waiting for the transfer can be prevented. When an interruption occurs, the reaction time to execute context switching is shortened, whereby response can be improved.

Figure 8:
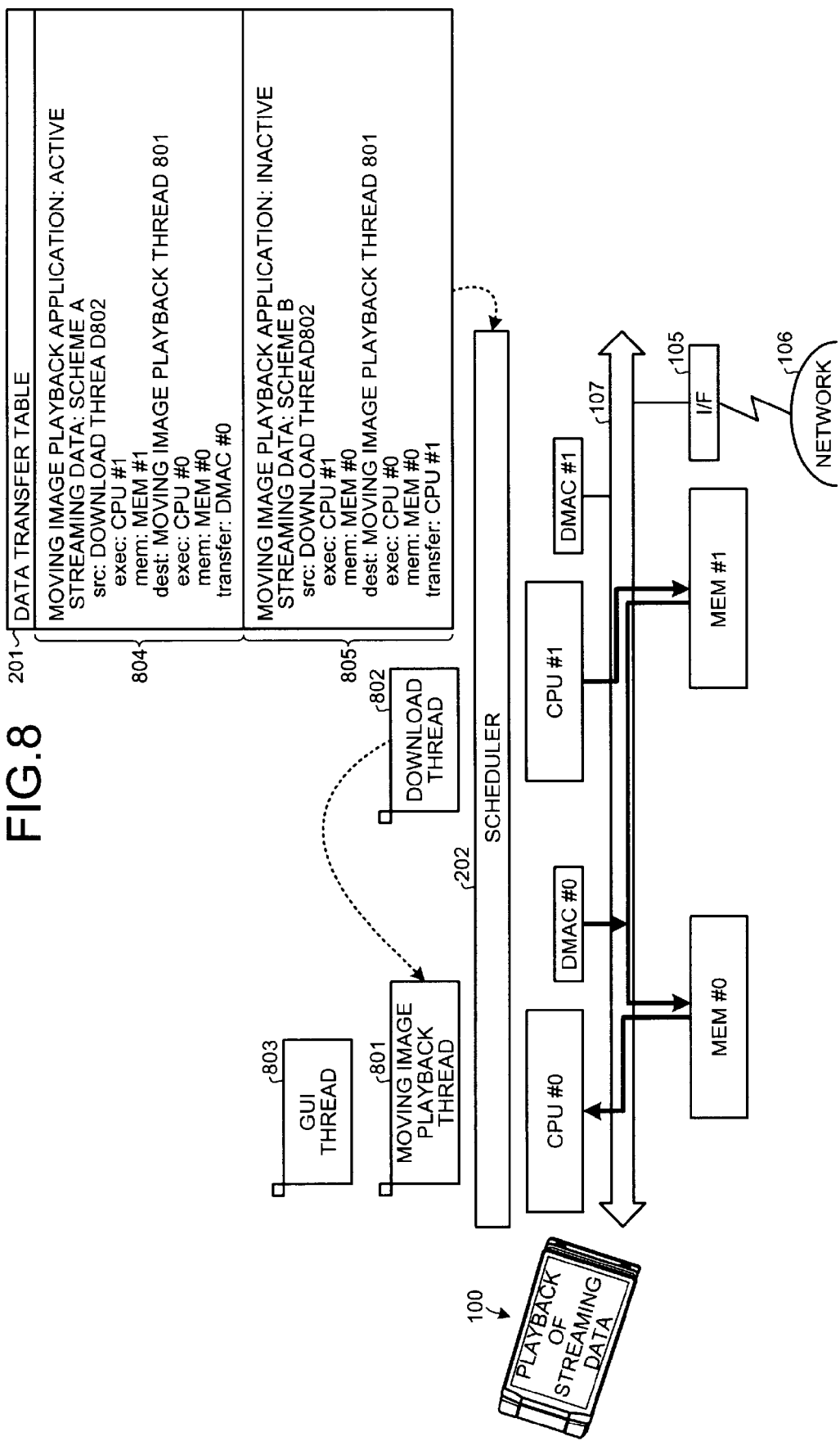
FIG. 8 is an explanatory diagram of a state of data transfer of streaming data during streaming playback.

FIG. 8 is an explanatory diagram of a state of data transfer of streaming data during streaming playback. The data transfer control apparatus 100 of FIG. 8 currently executes a moving image playback application. The moving image playback application includes a moving image playback thread 801 and a download thread 802. A GUI thread 803 is also currently executed and belongs to an application other than the moving image playback application. The download thread 802 may belong to an application other than the moving image playback application.

In the state depicted in FIG. 8, the state of the moving image playback application is "active" and therefore, the scheduler 202 selects a record 804 from the data transfer table 201. Based on the record 804, the scheduler 202 sets the data transfer scheme to be the scheme A. According to the content set, the download thread 802 writes the streaming data acquired from the I/F 105 into the MEM #1.

After the writing of the streaming data, the DMAC #0 transfers the streaming data from the MEM #1 to the MEM #0 and the moving image playback thread 801 reads the streaming data from the MEM #0 and displays the moving image on the display 104.

In a case where the streaming data is played back, the moving image cannot be displayed normally if the data is not transferred at a bit rate that is greater than or equal to the bit rate of the streaming data. Therefore, the scheme A capable of transferring the data at a high speed is suitable as the data transfer scheme in this case.

Figure 9:
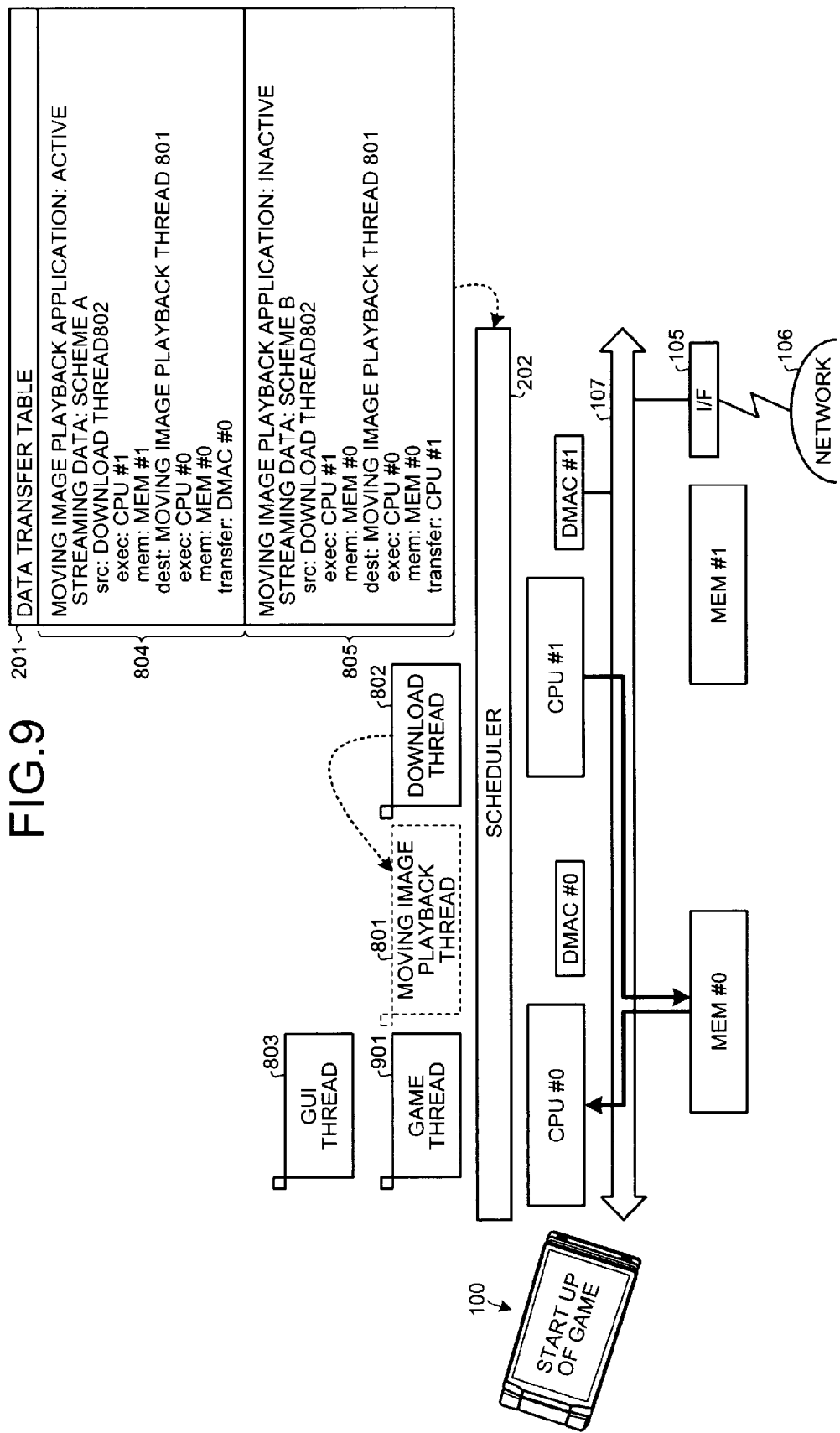
FIG. 9 is an explanatory diagram of a state of the data transfer of streaming data during execution of a game application.

FIG. 9 is an explanatory diagram of a state of the data transfer of streaming data during execution of a game application. The state of data transfer control apparatus 100 changed from a state where the data transfer control apparatus 100 currently executes the moving image playback application to a state of FIG. 9 where another application becomes "active"; the moving image playback application becomes "inactive"; and the playback of the moving image stands by. In FIG. 9, the game application different from the moving image playback application is "active" and a game thread 901 belonging to the game application is under execution by the CPU #0.

In the state depicted in FIG. 9, the state of the moving image playback application is "inactive" and therefore, the scheduler 202 selects a record 805 from the data transfer table 201. Based on the record 805, the scheduler 202 sets the data transfer scheme to be the scheme B. According to the contents set, the download thread 802 directly writes the streaming data acquired from the I/F 105 into the MEM #0. After the writing of the streaming data, the moving image playback thread 801 reads the streaming data from the MEM #0.

At this time, drawing on the display 104 is under execution by the game thread 901 and the moving image playback thread 801 does not draw consequent to being in standby. In this case, the download thread 802 transfers the streaming data to the MEM #0 while the moving image playback application is standing by. When the state of the moving image playback application becomes "active" during this transfer, the moving image playback thread 801 plays back the streaming data accumulated and thereby, can execute smooth moving image playback. The data transfer executed while the moving image playback application is standing by has no time restriction and is not urgent and therefore, the scheme B, which does not cause the bus 107 to become occupied, is suitable.

FIG. 10 is an explanatory diagram of a state of the streaming data transfer while a game application is interrupted. The state of the data transfer control apparatus 100 is changed from a state where the game application is "active" to the state depicted in FIG. 10 where the moving image playback application becomes "active".

In the state depicted in FIG. 10, the state of the moving image playback application is "active" and therefore, the scheduler 202 selects the record 804 from the data transfer table 201. Based on the record 804, the scheduler 202 sets the data transfer scheme to again be the scheme A. As described above, the data transfer control apparatus 100 according to the embodiment can dynamically switch the transfer scheme based on state changes of whether the application is "active" or "inactive".

The data transfer control apparatus 100 may switch the transfer scheme based on a state change other than changes between "active" and "inactive". Such a state change is, for example, a case where a change in the state occurs that the moving image playback application is "active" while the user, etc., changes the moving image playback to pause, or to rewind and play. In this case, the playback can be executed using the streaming data accumulated and therefore, the data does not have to be transferred at a high speed. Therefore, the data transfer control apparatus 100 may set the data transfer scheme to be the scheme B.

FIGS. 11A and 11B are flowcharts of a data transfer scheme transition process. The data transfer scheme transition process is executed as a portion of the function of the scheduler 202. The scheduler 202 manages the scheduling of applications executed by each of the CPUs using the scheduler of the CPU. The scheduler 202 represents the scheduler of a given CPU among the CPUs and manages the applications under execution in the data transfer control apparatus 100 and responses to each start-up request for an application, from the user. In the embodiment, description will be made assuming that the given CPU is the CPU #0.

Each of the CPUs determines whether a state change has occurred (step S1101). A state change refers to the starting up and ending of an application, and the switching of the application. If a CPU determines that no state change has occurred (step S1101: NO), the CPU again executes the process executed at step S1101. If the CPU determines that a state change has occurred (step S1101: YES), the CPU determines whether the state change is the ending of the execution of an application (step S1102).

If the CPU determines that the state change is the ending of the execution of an application (step S1102: YES), the CPU determines whether an application employing the data transfer scheme C has ended (step S1103). If the CPU determines that an application employing the data transfer scheme C has ended (step S1103: YES), the CPU releases the prohibition of the use of the DMAC that corresponds to the CPU (step S1104) and progresses to the process executed at step S1101. If the CPU determines that an application employing a data transfer scheme other than the data transfer scheme C has ended (step S1103: NO), the CPU progresses to the process executed at step S1101. When the execution of the application has ended, the CPU progresses to the process to be executed when "step S1101: YES" is established, to switch to the application currently executed.

If the CPU determines that the state change is not the ending of the execution of an application (step S1102: NO), the CPU determines whether an unanalyzed application is present (step S1105). If the CPU determines that an unanalyzed application is present (step S1105: YES), the CPU selects an unanalyzed application from among the applications that are currently executed (step S1106). After the selection, the CPU notifies the CPU #0 of information concerning the selected application.

The CPU #0 receives the notification and determines whether the selected application is registered in the data transfer table 201 (step S1107). If the CPU #0 determines that the selected application is registered in the data transfer table 201 (step S1107: YES), the CPU #0 selects the record of the selected application, from the data transfer table 201 (step S1108) and transmits the record to the notification source CPU. If multiple records are registered for the selected application, the CPU #0 may select from among records indicating conditions that coincide with the selected application, a record describing a state that matches the active/inactive state of the selected application.

The CPU receives the record and determines whether the data transfer scheme of the selected application changes consequent to the starting-up of a new application (step S1109). If the CPU determines that the data transfer scheme changes (step S1109: YES), the CPU executes a data transfer scheme setting process (step S1110). The data transfer scheme setting process will be described in detail with reference to FIG. 12.

After the execution of the data transfer scheme or if the CPU determines that the data transfer scheme does not change (step S1109: NO), the CPU sets the state of the selected application as "analyzed" (step S1111) and progresses to the process executed at step S1105.

If the CPU #0 determines that the selected application is not registered in the data transfer table 201 (step S1107: NO), the CPU #0 transmits to the notification source CPU, a report indicating that the selected application is not registered. The CPU receives the report indicating that the selected application is not registered and progresses to the process at step S1111.

If the CPU determines that no unanalyzed application is present (step S1105: NO), the CPU requests the CPU #0 to determine whether the state change is the starting-up of a new application (step S1112). If the CPU #0 determines that the state change is the starting-up of a new application (step S1112: YES), the CPU #0 determines whether the new application is registered in the data transfer table 201 (step S1113). If plural records of the selected application are present, the CPU #0 may select from among records indicating conditions that coincide with the selected application, a record describing a state that matches the active/inactive state of the selected application.

If the CPU #0 determines that the new application is registered in the data transfer table 201 (step S1113: YES), the CPU #0 selects the record of the new application from the data transfer table 201 (step S1114). After selecting the record, the CPU #0 executes the data transfer scheme setting process (step S1115). The data transfer scheme setting process will be described in detail with reference to FIG. 12.

After the execution of the data transfer scheme setting process comes to an end, the CPU #0 dispatches the new application using the scheduler 202 (step S1116). If the CPU #0 determines that the new application is not registered in the data transfer table 201 (step S1113: NO), the CPU #0 progresses to the process at step S1116. If the CPU #0 determines that the state change is not the starting-up of a new application (step S1112: NO), the CPU #0 executes normal scheduling using the scheduler 202 (step S1117). An application that is not registered in the data transfer table 201 may be, for example, an application downloaded by the user.

After the execution of the process at step S1116 comes to an end or after the process at step S1117 comes to an end, the CPU #0 progresses to the process executed at step S1101. For example, after progressing to the process, the CPU #0 instructs each of the CPUs to determine whether a state change has occurred.

FIG. 12 is a flowchart of the data transfer scheme setting process. The data transfer scheme setting process is executed by each of the CPUs. For simplification of the description, a case will be described where the CPU #0 executes the process. When the data transfer scheme setting process is executed, the CPU #0 can acquire the selected record of the data transfer table 201 as an argument.

The CPU #0 determines the data transfer scheme from the selected record (step S1201). If the data transfer scheme of the selected record is the scheme A (step S1201: SCHEME A), the CPU #0 determines that the transfer of the data to be transferred is urgent and therefore, the CPU #0 makes a setting of the DMAC (step S1202) and causes the data transfer scheme setting process to come to an end. If the data transfer scheme is dispatched from an application employing the scheme C to an application employing the scheme A, the CPU #0 releases the prohibition of the use of the DMAC #0 and makes a setting of the DMAC.

If the data transfer scheme of the selected record is the scheme B (step S1201: SCHEME B), the CPU #0 determines that the storage and the transfer of the data are not urgent and therefore, the CPU #0 makes a setting of a transfer destination address (step S1203) and causes the data transfer scheme setting process to come to an end. For example, the CPU #0 sets the transfer destination address in the CPU that stores the data to the transfer source memory. For example, in the case of FIG. 6, the CPU #0 sets in the CPU #1, the transfer destination address stored in the MEM #0.

If the data transfer scheme of the selected record is the scheme C (step S1201: SCHEME C), the CPU #0 determines that the storage of the data to be transferred is urgent and the transfer thereof is not urgent and therefore, the CPU #0 makes a setting of prohibition of use of the DMAC (step S1204). After the setting, the CPU #0 causes the data transfer scheme setting process to come to an end. For example, the CPU #0 sets the prohibition of use of the DMAC #0 that corresponds to the CPU #0.

In FIGS. 11 and 12, the data transfer control apparatus 100 prohibits the use of the DMAC when the data transfer scheme is the scheme C and thereby, causes the CPU to transfer the data to be transferred. However, configuration may be such that the data transfer control apparatus 100 does not prohibit the use of the DMAC and makes a setting for the data to be directly transferred to the CPU. Instead of prohibiting the use of the DMAC, the data transfer control apparatus 100 may prohibit the burst transfer that occupies the bus of the DMAC transfer methods. Among the DMACs, in addition to the burst transfer, a DMAC is also present that can execute single transfer by which transfer is executed for each byte, or one word that is a data amount unit for computers (see "Fully Using DMC": Fujitsu, [online], [Retrieved on May 6, 2010], the Internet <URL:http://jp.fujitsu.com/microelectronics/products/micom/support/knowhow/fr-hard05.html>)

When the burst transfer is prohibited and the data is transferred using the single transfer, the DMAC does not occupy the bus and therefore, the data transfer control apparatus 100 can maintain the throughput without drops caused by the CPU waiting for data transfer. Even when an interruption occurs, the data transfer control apparatus 100 can shorten the response time to execute context switching and thereby, can improve responsiveness.

Although the data transfer control apparatus 100 according to the embodiment employs the multi-core form, the data transfer control apparatus 100 may employ a single-core form. For example, a state is assumed where, for the application #0 described with reference to FIG. 5, the thread #0 executing the communication stores the data to be transferred in the work area of the thread #0 and transfers the data to be transferred to the work area of the thread #1 that uses the data to be transferred and acquired in the communication.

In this case, if the state of the application #0 is "active", the scheme A may be employed as the data transfer scheme and the DMAC may transfer the data from the work area of the thread #1 to the work area of the thread #0. If the state of the application #0 is "inactive", the scheme B may be employed as the data transfer scheme and the thread #1 may directly write the data to be transferred into the work area of the thread #0.

Even if the scheme C is employed as the data transfer scheme executed by the single core, the example of the application #2 described with reference to FIG. 7 is applicable thereto. For example, the thread #4 of the application #2 may store the data to the work area of the thread #4 and the thread #5 may directly read the data from the work area of the thread #4.

As described, according to the data transfer control apparatus, the data transfer control method, and the data transfer control program, it is determined whether the data transfer is urgent, based on the type of the application currently executed and if it is determined that the data transfer is not urgent, use of the DMAC is prohibited. Thereby, the data transfer control apparatus can reduce frequent DMA transfers, whereby drops in throughput caused by the processor having to wait for the data transfer, can be prevented. The data transfer control apparatus can reduce the frequency DMA transfers and therefore, the response time for an interrupt process requiring context switching can be shortened and the response to a real-time process can be improved.

The data transfer control apparatus may determine whether the data transfer is urgent based on the type of the application and state changes. Thus, the data transfer control apparatus can prevent drops in throughput caused by the processor having to wait for the data transfer and can improve the response to a real-time process. The data transfer control apparatus makes determinations based on state changes of the application and thus, can change the data transfer scheme more dynamically than by determinations based on the type of the application. Consequently, the data transfer control apparatus can further increase the states where drops in throughput can be prevented and the response to a real-time process can be improved.

The data transfer control apparatus may determine whether the data transfer is urgent, based on the type of the application and state changes when the state of the application is changed from "active" to "inactive" or from "inactive" to "active". Thereby, the data transfer control apparatus can prevent drops in throughput caused by the processor for the transfer and can improve the response property having to wait for a real-time process.

When the data transfer control apparatus is implemented by a mobile terminal, the display area of the display employed by the mobile terminal is small and for example, a quarter video graphics array (QVGA) may be employed that includes 320×240 pixels. For such a display having a small display area, an application becoming "inactive" is highly likely to be entirely hidden by an application that becomes "active". The application entirely hidden is invisible from the user and therefore, the user may suffer no inconvenience even if the data transfer is slowed down. In this case, instead of reducing the transfer speed of the data, the data transfer control apparatus can prevent drops in throughput of the processor and can facilitate improvement of responses in real-time.

The data transfer control apparatus may transfer data by using the DMAC when it is determined that the transfer of the data is urgent. Thereby, the data transfer control apparatus can transfer the data at a high speed only when the transfer is urgent. For example, when the application becomes "active" and the urgency is enhanced, the data transfer control apparatus can transfer the data at a high speed using the DMAC.

The data transfer control apparatus determines whether the storage of the data by another processor into the transfer source memory is urgent and if the data transfer control apparatus determines that the storage and the transfer of the data to be stored are not urgent, the data transfer control apparatus may cause the other processor to transfer the data. Thus, when the storage and the transfer are not urgent, the data transfer control apparatus can prevent drops in the throughput of the processor and can facilitate improvement of responses in real-time.

If it is determined that the storage of the data to be transferred is urgent and the transfer of the data is not urgent, the data transfer control apparatus may cause the processor detecting the process to transfer the data. Thus, the data transfer control apparatus can prevent drop in the throughput of the processor and can facilitate improvement of responses in real-time response property, while executing the storage of the data at a high speed.

The data transfer control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to the data transfer control apparatus, the data transfer control method, and the data transfer control program, drops in throughput caused by the CPU standing by while waiting for transfers can be prevented and the response to real-time processes can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data transfer control apparatus comprising:
a transferring unit configured to transfer data from a transfer source memory to a transfer destination memory, according to an instruction from a first processor; and
a first processor configured to:
detect a process being executed by the first processor, determine whether transfer of the data is urgent, based on the type of the detected process, and control the transferring unit to transfer the data or control the first processor to read the data from the transfer source memory or the transfer destination memory, based on a determination result, wherein the first processor further detects that a state of the process changes from an active state to an inactive state or from the inactive state to the active state, and the first processor determines whether the transfer of the data is urgent, based on the type of the process and a detection result concerning the state of the process.

2. The data transfer control apparatus according to claim 1, wherein the first processor further detects a state change of the first processor, and the first processor determines whether the transfer of the data is urgent, based on the type of the process and a state change of the process.

3. The data transfer control apparatus according to claim 1, wherein the first processor upon determining that the transfer is urgent, controls the transferring unit such that the data is transferred.

4. The data transfer control apparatus according to claim 1, wherein the first processor determines whether storage of the data into the transfer source memory by a second processor is urgent, and the first processor upon determining that the storage and the transfer of the data are not urgent, controls the second processor to transfer the data to the transfer destination memory.

5. The data transfer control apparatus according to claim 1, wherein the first processor further determines whether storage of the data into the transfer source memory by a second processor is urgent, and the first processor upon determining that the storage of the data is urgent and the transfer of the data is not urgent, controls the first processor to transfer the data.

6. A data transfer control method executed by a processor for controlling a transferring apparatus that transfers data from a transfer source memory to a transfer destination memory, the data transfer control method comprising:

detecting a process executed by the processor;

determining whether transfer of the data by the transferring apparatus is urgent, based on the type of the detected process;

instructing the transferring apparatus to transfer the data, when the transfer is determined to be urgent; and reading the data from the transfer source memory or the transfer destination memory by the processor when the transfer is determined to not be urgent, wherein the first processor further detects that a state of the process changes from an active state to an inactive state or from the inactive state to the active state, and the first processor determines whether the transfer of the data is urgent, based on the type of the process and a detection result concerning the state of the process.

7. A multi processors system comprising:

a plurality of cores, a plurality of memories configured to store processed data processed by the plurality of cores, respectively, and a transferring apparatus configured to conduct data transferring processes between the plurality of memories wherein, one of the plurality of cores sets priority of the data transferring processes between the memories, the data transferring processes being processed by the transferring apparatus based on type of the processes processed by the plurality of cores and changes, based on the priority, between a writing process of the processed data from the plurality of cores to the plurality of memories and the data transferring process by the transferring apparatus, wherein the first processor further detects that a state of the process changes from an active state to an inactive state or from the inactive state to the active state, and the first processor determines whether the transfer of the data is urgent, based on the type of the process and a detection result concerning the state of the process.

8. A method for controlling a multi processors system that includes a plurality of cores and a plurality of memories configured to store processed data processed by the plurality of cores, respectively, the method comprising:

sets priority of data transferring processes between the plurality of memories, to be processed by the transferring apparatus based on type of the processes processed by the plurality of cores, and changes, based on the priority, between a writing process of the processed data from the plurality of cores to the plurality of memories and the data transferring processes, wherein the first processor further detects that a state of the process changes from an active state to an inactive state or from the inactive state to the active state, and the first processor determines whether the transfer of the data is urgent, based on the type of the process and a detection result concerning the state of the process.

* * * * *